Figure 1:
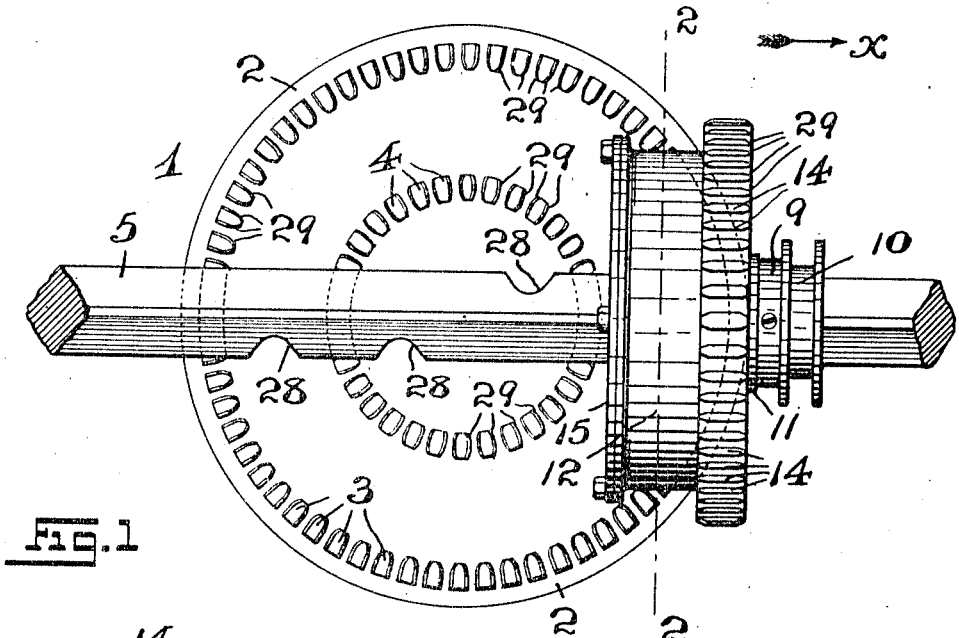

L. E. SCHLOTTERBACK.
TRANSMISSION MECHANISM.
APPLICATION FILED AUG. 4, 1911.

1,026,462.

Patented May 14, 1912.
3 SHEETS—SHEET 1.

WITNESSES:
Fredk H. W. Fraentzel
Harry E. Pfeiffer

INVENTOR:
Lewis E. Schlotterback,
BY
Fraentzel and Richards,
ATTORNEYS

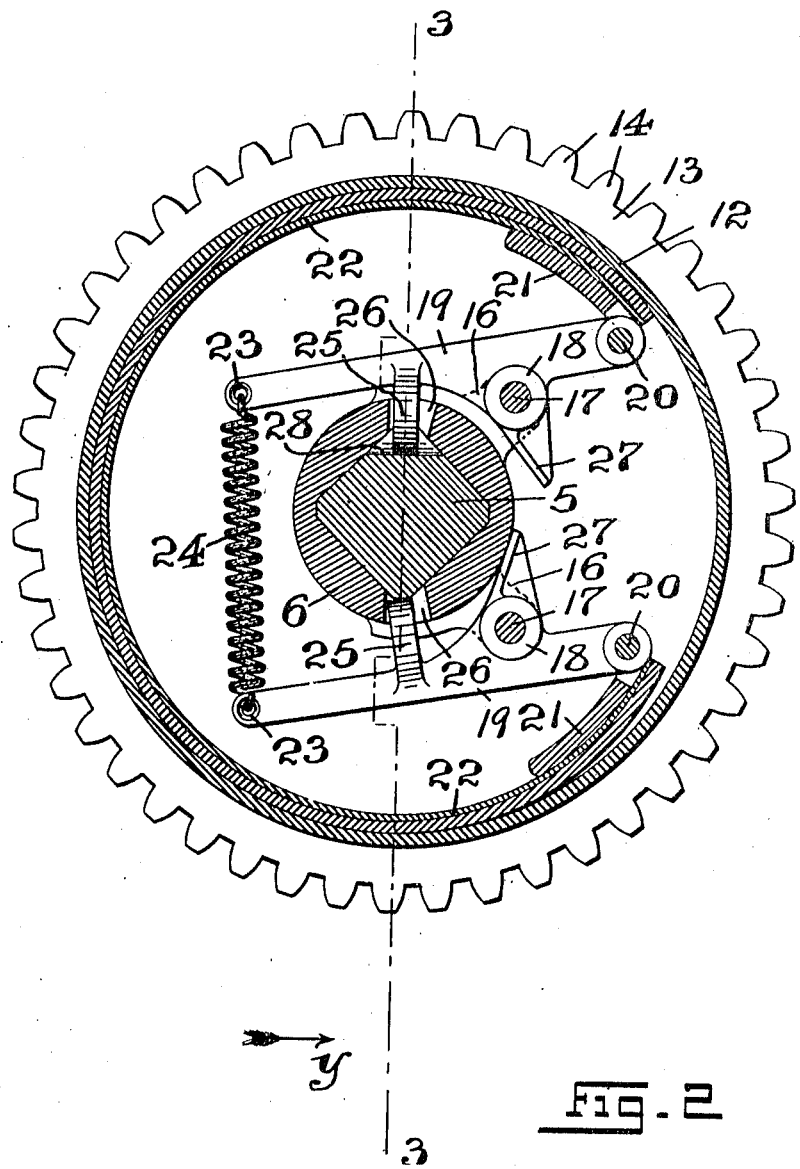

UNITED STATES PATENT OFFICE.

LEWIS E. SCHLOTTERBACK, OF EAST ORANGE, NEW JERSEY, ASSIGNOR TO L. E. SCHLOTTERBACK MANUFACTURING CO., A CORPORATION OF NEW JERSEY.

TRANSMISSION MECHANISM.

1,026,462.   Specification of Letters Patent.   Patented May 14, 1912.

Application filed August 4, 1911. Serial No. 642,222.

*To all whom it may concern:*

Be it known that I, LEWIS E. SCHLOTTERBACK, a citizen of the United States, residing at East Orange, in the county of Essex and State of New Jersey, have invented certain new and useful Improvements in Transmission Mechanism; and I do hereby declare the following to be a full, clear, and exact description of the invention, such as will enable others skilled in the art to which it appertains to make and use the same, reference being had to the accompanying drawings, and to characters of reference marked thereon, which form a part of this specification.

The present invention has reference, generally, to improvements in transmission mechanism for auto-vehicles, and other uses, and the invention relates, more particularly, to a simple, efficient and easily operated speed-changing transmission mechanism combined with an automatic clutch device coöperating therewith.

The present invention has for its principal object to provide a novel construction of transmission mechanism which may be operated to change the speed of a driven shaft or wheel, the same being provided with an automatic clutch device which is automatically released from operative or driving condition when said transmission mechanism is operated to change from one speed to another, thus permitting the control of the speed-changing operation and the clutch-manipulation by means of a single movement, such as the throwing of a single lever. It is thus rendered possible to use a variable speed-gearing, and to change from one driving speed to another, without danger of stripping, breaking or otherwise injuring the gear-teeth of said gearing, or other parts of the transmission mechanism.

A further object of the present invention is to provide a combined relation of variable speed gearing transmission mechanism with an automatic clutch device, whereby the "take up" of the clutch, when changing from one speed to another, is gradual, thus avoiding the subjection of the transmission mechanism and the apparatus driven thereby to the sudden strains and stresses consequent upon the sudden "throwing in" of a clutch; and, furthermore, obviating the jumping of the driven apparatus when the speed is changed.

Other objects of the present invention not at this time more particularly enumerated, will be clearly understood from the following detailed description of my present invention.

With the various objects of this invention in view, the same consists, primarily, in the novel combined variable speed transmission and clutch mechanism hereinafter set forth; and, furthermore, this invention consists in the novel arrangements and combinations of the various mechanisms and their parts, as well as in the details of the construction thereof, all of which will be hereinafter more fully described in the following specification, and then finally embodied in the clauses of the claims which are appended to and which form an essential part of this specification.

The invention is clearly illustrated in the accompanying drawings, in which:—

Figure 3:
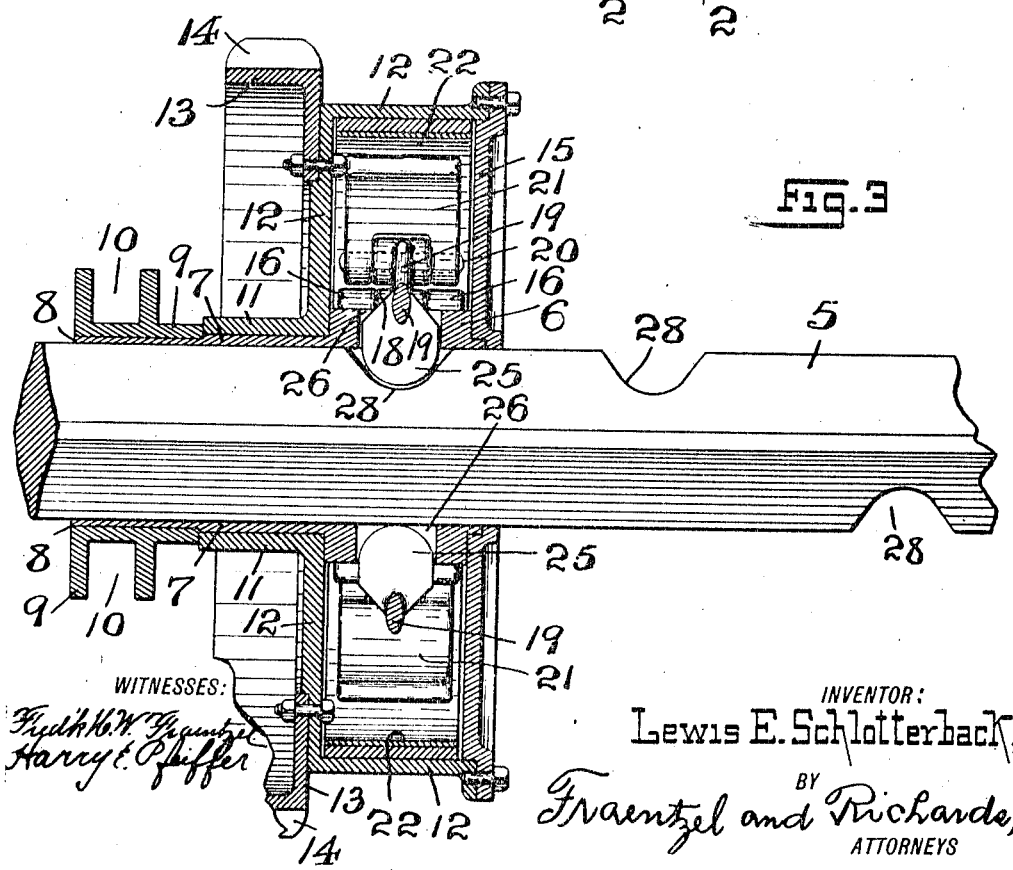

Figure 1 is a side elevation of the novel construction of combined variable speed transmission and clutch mechanism made according to and embodying the principles of the present invention; Fig. 2 is a detail transverse section of the same taken on line 2—2 in said Fig. 1, looking in the direction of the arrow *x*, said view being drawn upon an enlarged scale; and Fig. 3 is a detail longitudinal cross-section taken on line 3—3 in said Fig. 2, looking in the direction of the arrow *y*.

Similar characters of reference are employed in all of the hereinabove described views, to indicate corresponding parts.

Referring now to the said drawings, the reference-character 1 indicates the complete novel construction of combined variable speed transmission and clutch mechanism made according to and embodying the principles of the present invention, the same comprising a rotatable disk 2 having upon its face a series of concentrically arranged sets of gear-teeth, which extend outwardly from the face of said disk, and at right angles thereto. The outer row or set of gear-teeth 3 are the high-speed driving gear-teeth, while the inner row or set of gear-teeth 4 are the low-speed driving gear-teeth. Of course it will be clearly evident, that an intermediate row or rows of gear-teeth may be arranged between said outer gear teeth 3 and said inner gear-teeth 4, when desired, so as to provide a greater variety of speeds intermediate of said high and low speeds. For the purposes of greater simplicity of description and illustration, however, but two sets or rows of driving gear-teeth are shown, although I do not wish to limit this invention to any particular number of sets or rows driving gear-teeth whereby a variability of driving speed is obtained and transmitted from a prime mover. Said disk 2 is driven or rotated through the agency of any prime-mover or other source of power, and to this end may be mounted, for example, upon the crank-shaft of any internal combustion or other engine, the power shaft of an electric motor, or any other source of power.

The reference-character 5 indicates a transmission shaft from which the power is transmitted to the apparatus or devices to be moved, either directly or indirectly. A portion of said transmission shaft 5 is preferably of polygonal cross-section. Slidably mounted upon said transmission shaft, so as to be movable forward and backward upon the polygonal portion thereof, and the same being adapted to rotate with said transmission shaft, is a carrier-member 6, the same being provided with a rearwardly extending journal-portion 7 having a reduced extension 8. Secured upon said reduced extension of said journal-portion 7 is the flanged collar 9 providing the groove 10 for receiving the fork of a shifting-lever (not shown) whereby said carrier-member 6 is moved forward and backward upon said transmission-shaft 5. Rotatably mounted upon said journal-portion 7 of said carrier-member 6 is the hub-portion 11 of a clutch-drum 12. Secured to said clutch-drum, by means of bolts or other suitable fastening means, is a gear-member 13, the gear-teeth 14 of which are adapted to be moved into meshing contact with either of said rows or sets of gear-teeth 3 and 4, which are arranged upon said disk 2. The interior of said clutch-drum 12 may be closed at its open end by means of a suitable cover-plate or closure 15, secured thereto in any desirable manner. Said carrier-member 6 is normally located within said clutch-drum 12, and said carrier-member is provided with suitably arranged and disposed pairs of perforated ears or lugs 16. Pivotally connected with each pair of said perforated ears or lugs 16, by means of the fulcrum-pins 17, is the hub-portion 18 of a clutch-operating lever 19. Pivotally connected with one end of each clutch-operating lever 19, by means of a pin 20, is a clutch-band shoe 21, each clutch-band shoe 21 being adapted to operatively support and connect with said clutch-operating levers 19, one of the respective ends of a clutch-band 22, the latter extending around and being in practical contact with the interior surface of said clutch-drum 12. The free ends of said clutch-operating levers 19 are each provided with suitable perforations 23 by means of which an interconnecting coil-spring 24 may be connected between said clutch-operating levers, so as to subject the same to the required tension to overcome any tendency of movement of said levers 10, due to centrifugal force generated in the moving mechanism, and to give the initial operating impulse to the clutch-operating levers. Each of said clutch-operating levers 19 is provided, at a point between its fulcrum and its free end, with an operating trigger 25, preferably forming an integral part thereof, and said carrier-member 6 is provided with a pair of suitably disposed openings or passages 26 through which said triggers 25 may respectively pass to permit the same to ride operatively in sliding contact with portions of said transmission shaft 5, when said carrier-member 6 is moved forward or backward upon said transmission shaft. Said clutch-operating levers 19 are further provided with stop-projections 27 arranged to engage at proper times with the outer surface of said carrier-member 6 to limit the pivotal movements of said clutch-operating levers in one direction. The said transmission-shaft 5 is provided with a series of depressions or notches 28 which, at proper times, engage said triggers 25, thereby permitting the operation of either one or the other of said clutch-operating levers 19.

The operation of the novel construction of combined variable speed-transmission and clutch mechanism, the details of the construction of which are above described, is as follows:—Referring to the drawings, the mechanism is illustrated in a position in which the same is arranged to transmit power at high speed, and it will be noticed that the gear-teeth 14 of said gear-member 13 of said clutch-drum 12 are in mesh with the high speed driving gear-teeth 3 of said disk 2. When said gear-teeth 3 and 14 are completely and properly in their meshed relation, the trigger 25 of one of said clutch-operating levers 19 is raised out of a depression or notch 28 and in contact with the outer surface of said transmission shaft 5, thus forcing said clutch-operating lever to its stopped position, with its stop-projection 27 against said carrier-member 6, and consequently held against any pivotal movement. Consequently this rigidly held clutch-operating lever holds one end of said clutch-band 22 against movement, or in other words it is anchored. The trigger 25 of the opposite clutch-operating lever 19 has been caused to ride into a depression or notch 28 of said transmission shaft 5, and the tension of said coil-spring 24 has caused said opposite clutch-operating lever to oscillate, so that the same, acting through its connection with said clutch-band 22, forces said clutch-band into operative engagement with said clutch-drum 12, whereby the rotation of said clutch-drum 12, as caused by the meshing gears, is transmitted to said carrier-member 6, which is thereby caused to rotate therewith, and consequently said transmission-shaft, being arranged to rotate with said carrier member, is likewise put in motion. Assume now that it is desired to shift from high speed to low speed. To attain this end, the carrier-member 6 is shifted rearwardly upon said transmission-shaft 5. With the very beginning of this sliding movement the trigger 25, which is in engagement with said notch or depression 28, begins to lift as it climbs the side of the latter, and by the time the gear-teeth 14 of said gear-member 13 have been moved or released from their meshed relation with said gear-teeth 3 of said disk 2, the said trigger 25 has been entirely raised and is riding in contact with the normal surface of said transmission-shaft, thereby oscillating said clutch-operating lever 19 in an opposite direction and consequently causing the same to pull said clutch-band 22 from its clutched relation with said clutch-drum 12, the opposite clutch-operating lever 19 remaining in its rigidly held position since it meets with no notches or depressions 28 in the course of this movement. A consequence then of the release of said clutch-band is to permit said clutch-drum 12 and its gear-member 13 to turn freely upon said carrier-member 6 without rotating the latter or the transmission-shaft 5. The continued shifting of said carrier-member 6 carries said clutch-drum 12 and its gear-member 13 therewith until the gear-teeth 14 are brought into contact with the low speed driving gear-teeth of said disk 2, forcing the former into mesh with the latter. By the time the meshed relation of said respective gear-teeth is established, so that said clutch-drum is caused to rotate, the trigger 25 of said clutch-operating lever 19 comes in contact with a second notch or depression 28 of said transmission shaft 5, thereby again permitting said clutch-operating lever to be oscillated to establish the clutched relation between said clutch-band 22 and said clutch-drum 12, and a consequent transmission of power to said transmission shaft 5. Said trigger 25 moves into said notch or depression in a comparatively gradual manner so that said clutch-band takes hold with increasing pressure upon said clutch-drum, thereby obviating sudden stresses, strains and jumping of the mechanism as heretofore mentioned. It will be noticed, that the notches or depressions 28 on the lower side of said transmission shaft 5 are located in such a manner that they will engage the opposite clutch-operating lever trigger, whereas the absence of notches in the same relative position upon the upper side of said transmission-shaft renders the relation of the respective clutch-operating levers 19 to be reversed, so that the lever heretofore described as movable is now the rigidly held lever and the opposite lever now becomes the movable lever which controls the operating of said clutch-band 22. The first of said notches or depressions 28 on the lower side of said transmission-shaft 5 is a neutral notch or depression; that is, it affords an indication, by engaging the trigger 25, that the gear-member 13 has been carried to a point substantially opposite the center of said disk 2, where it is out of mesh with both rows or sets of gear-teeth 3 and 4, and consequently cannot be turned or rotated in either direction. This point would be the normal point of rest for the transmission gearing. If the said carrier-member 6 is shifted rearwardly beyond the said neutral point, the gear-member 13 is brought into contact with the low-speed driving gear-teeth 4 on their opposite side, thereby rotating the former in the reverse direction, as will be clearly understood. When the parts are in this position, the trigger 25 of the opposite clutch-operating lever 19 is carried into engagement with the last notch or depression, thereby operating said clutch-mechanism in the manner above described to transmit this reverse rotation, at low speed, to the said carrier-member 6 and transmission-shaft 5, all of which will be clearly understood from an inspection of Fig. 1 of the drawings.

I prefer to provide the respective gear-teeth of my transmission mechanism with chamfered ends 29, whereby the same are caused to more easily assume their meshed relation with each other when the same are moved together, as will be very apparent.

I am aware that some changes may be made in the general arrangements and combinations of the various devices and parts, as well as in the details of the construction thereof, without departing from the scope of the present invention as set forth in the foregoing specification, and as defined in the clauses of the claim which is appended to the same. Hence, I do not limit my invention to the exact arrangements and combinations of the devices and parts as described in said specification, nor do I confine myself to the exact details of the construction of the said devices and parts as illustrated in the accompanying drawings.

I claim:—

1. A combined variable speed transmission and clutch mechanism comprising a transmission shaft, a carrier-member slidably mounted on said transmission-shaft and rotating therewith, a gear mounted to rotate freely upon said carrier-member, and automatic clutch-mechanism arranged with said gear and said carrier-member for transmitting the rotary movement of the former to the latter at predetermined times.

2. A combined variable speed transmission and clutch mechanism comprising a transmission shaft, a carrier-member slidably mounted on said transmission shaft and rotating therewith, a gear mounted to rotate freely upon said carrier-member, and automatic clutch-mechanism arranged with said gear and said carrier-member for transmitting the rotary movement of the former to the latter at predetermined times, and means for driving said gear at variable speeds.

3. A combined variable speed transmission and clutch-mechanism comprising a driving disk provided with a series of concentrically arranged sets of gear-teeth, a transmission-shaft, a carrier-member slidably mounted on said transmission-shaft, and rotating therewith, a gear mounted to rotate freely upon said carrier-member and adapted to be carried thereby into meshing engagement with any one of said sets of gear-teeth on said driving-disk, and automatic clutch mechanism arranged with said gear and said carrier-member for transmitting the rotary movement of the former to the latter at predetermined times.

4. A combined variable speed transmission and clutch mechanism comprising a driving disk provided with a series of concentrically arranged sets of gear-teeth, a transmission-shaft, a carrier-member slidably mounted on said transmission-shaft, and rotating therewith, a gear mounted to rotate freely upon said carrier-member and adapted to be carried thereby into meshing engagement with any one of said sets of gear-teeth on said driving disk, automatic clutch-mechanism arranged with said gear and said carrier-member for transmitting the rotary movement of the former to the latter at predetermined times, and means upon said transmission-shaft for operating said clutch-mechanism.

5. A combined variable speed transmission and clutch-mechanism comprising a transmission-shaft, a carrier-member slidably mounted on said transmission-shaft and rotating therewith, a clutch-drum rotatably mounted on said carrier-member, a gear-member connected with said clutch-drum, a clutch-band coöperating with said clutch-drum, and means carried by said carrier-member and operated by the slidable movements of the same to automatically operate said clutch-band at proper times.

6. A combined variable speed transmission and clutch-mechanism comprising a transmission-shaft, a carrier-member slidably mounted on said transmission-shaft and rotating therewith, a clutch-drum rotatably mounted on said carrier-member, a gear-member connected with said clutch-drum, a clutch-band coöperating with said clutch-drum, means carried by said carrier-member and operated by the slidable movements of the same to automatically operate said clutch-band at proper times, and means for driving said gear-member and clutch-drum at variable speeds.

7. A combined variable speed transmission and clutch-mechanism comprising a transmission-shaft provided with suitably disposed depressions or notches in its body, a carrier-member slidably mounted on said transmission-shaft and rotating therewith, a gear mounted to rotate freely on said carrier-member, clutch-mechanism connected with said gear, clutch-operating mechanism carried by said carrier-member, said clutch-operating mechanism being operated by engagement with said notches or depressions of said transmission-shaft when said carrier-member is slidably moved.

8. A combined variable speed transmission and clutch mechanism comprising a transmission-shaft provided with suitably disposed depressions or notches in its body, a carrier-member slidably mounted on said transmission-shaft and rotating therewith, a gear mounted to rotate freely on said carrier-member, clutch-mechanism connected with said gear, clutch-operating mechanism carried by said carrier-member, said clutch-operating mechanism being operated by engagement with said notches or depressions of said transmission-shaft when said carrier-member is slidably moved, and means for driving said gear at variable speeds.

9. A combined variable speed transmission and clutch-mechanism comprising a transmission-shaft provided with suitably disposed depressions or notches in its body, a carrier-member slidably mounted on said transmission-shaft and rotating therewith, a clutch-drum rotatably mounted on said carrier-member, a gear-member connected with said clutch-drum, a clutch-band coöperating with said clutch-drum, clutch-operating levers carried by said carrier-member and connected with said clutch-band, and means connected with said clutch-operating levers engageable by said transmission-shaft and its notches or depressions to control the movement of said levers to operate said clutch-band at proper times.

10. A combined variable speed transmission and clutch-mechanism comprising a transmission-shaft provided with suitably disposed depressions or notches in its body, a carrier-member slidably mounted on said transmission-shaft and rotating therewith, a clutch-drum rotatably mounted on said carrier-member, a gear-member connected with said clutch-drum, a clutch-band coöperating with said clutch-drum, clutch-operating levers carried by said carrier-member and connected with said clutch-band, and means connected with said clutch-operating lever engageable by said transmission-shaft and its notches or depressions to control the movement of said levers to operate said clutch-band at proper times, and means for driving said gear-member and clutch-drum at variable speeds.

11. A combined variable speed transmission and clutch-mechanism comprising a driving disk provided with a series of concentrically arranged sets of gear-teeth, a transmission shaft provided with suitably disposed depressions or notches in its body, a carrier-member slidably mounted on said transmission-shaft and rotating therewith, a clutch-drum rotatably mounted on said carrier-member, a gear-member connected with said clutch-drum and adapted to be carried into meshing contact with any one of said sets of gear-teeth on said driving-disk when said carrier-member is slidably shifted, a clutch-band coöperating with said clutch-drum, clutch-operating levers carried by said carrier-member and connected with said clutch-band, and means connected with said clutch-operating levers engageable by said transmission-shaft and its notches or depressions to control the movement of said levers to release said clutch-band when said gear-member is moved out of mesh with one set of gear-teeth of said driving-disk, and to thrown in said clutch-band when said gear-member has been moved into meshing relation with another set of gear-teeth of said driving-disk.

12. A combined variable speed transmission and clutch-mechanism comprising a driving-disk provided with a series of concentrically arranged sets of gear-teeth, a transmission-shaft, a gear-member, means for slidably carrying said gear-member upon said transmission-shaft to cause the same to engage with any one of said sets of gear-teeth of said driving-disk, and automatic clutch mechanism for imparting the rotary movement of said gear-member to said transmission shaft when the same is in mesh with a set of gear-teeth of said driving-disk and releasing said gear-member when the same is shifted from one set of gear-teeth of said driving-disk to another.

13. A combined variable speed transmission and clutch-mechanism comprising a driving disk provided with a series of concentrically arranged sets of gear-teeth, a transmission-shaft provided with suitably disposed depressions or notches in its body, a combined gear-member and clutch-drum, means for slidably carrying said combined gear-member and clutch-drum upon said transmission-shaft to cause said gear-member to mesh with any one of said sets of gear-teeth on said driving-disk, a clutch-mechanism carried with said combined gear-member and clutch-drum, and means for operating said clutch-mechanism engageable by said transmission-shaft and its depressions or notches to impart the rotary motion of said gear-member to said transmission shaft at predetermined times.

In testimony, that I claim the invention set forth above I have hereunto set my hand this 27th day of July, 1911.

LEWIS E. SCHLOTTERBACK.

Witnesses:
HERMAN J. KOEHLER,
GEORGE D. RICHARDS.